Figure 1:
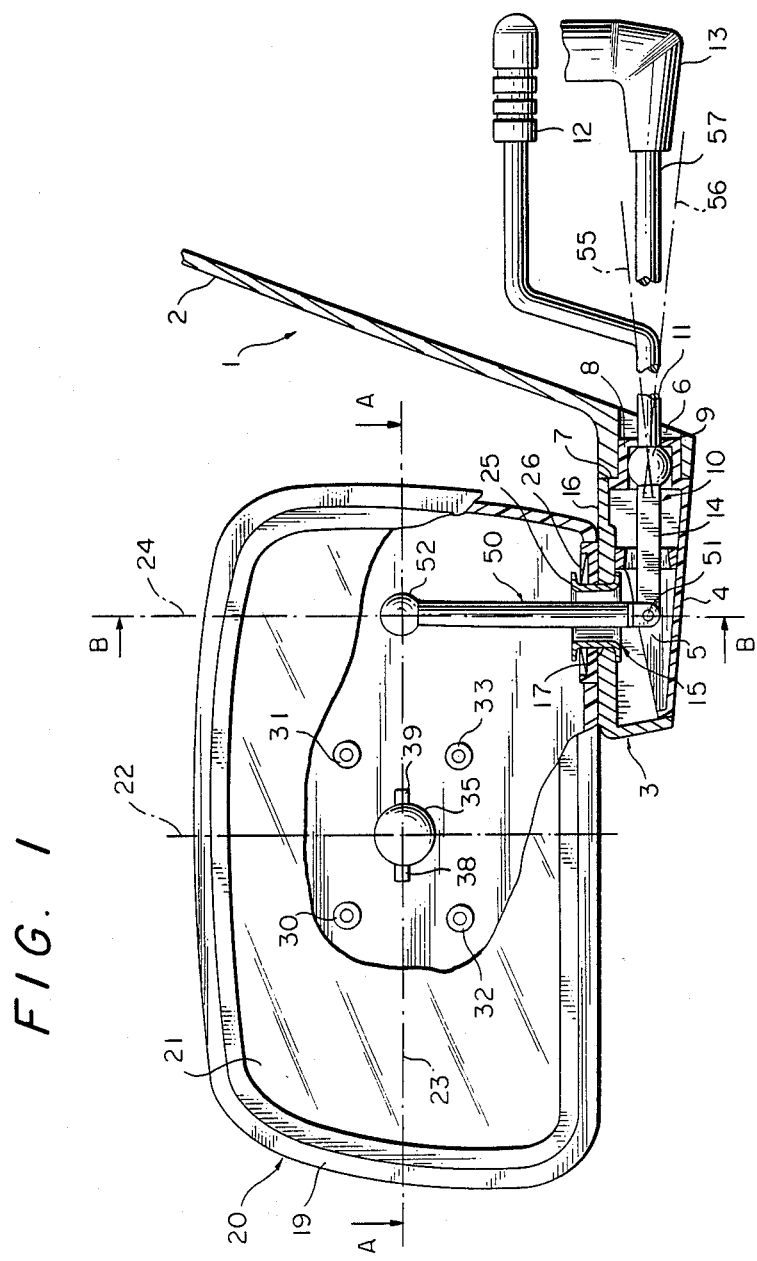

United States Patent [19]

Seitz

[11] Patent Number: 4,863,255
[45] Date of Patent: Sep. 5, 1989

[54] OUTSIDE REAR-VIEW MIRROR WITH A MECHANICALLY ADJUSTABLE MIRROR GLASS FOR A VEHICLE

[75] Inventor: Edwin Seitz, Neuenbuch, Fed. Rep. of Germany

[73] Assignee: Hohe KG, Collenberg, Fed. Rep. of Germany

[21] Appl. No.: 152,558

[22] Filed: Feb. 5, 1988

[30] Foreign Application Priority Data

Feb. 6, 1987 [DE] Fed. Rep. of Germany ....... 8701766

[51] Int. Cl.⁴ .......................... G02B 7/18; B60R 1/06
[52] U.S. Cl. .................................... 350/635; 248/479; 248/480; 248/485; 350/604; 350/636
[58] Field of Search ............... 350/604, 634, 635, 639; 248/479, 484, 487, 485, 486, 480

[56] References Cited

U.S. PATENT DOCUMENTS

| 4,341,444 | 7/1982 | Stelma | 350/634 |
| 4,603,045 | 1/1987 | Suzuki | 350/606 |
| 4,640,590 | 2/1987 | Wunsch | 350/634 |
| 4,660,944 | 4/1987 | Suzuki et al. | 350/604 |

FOREIGN PATENT DOCUMENTS

| 0045635 | 2/1982 | European Pat. Off. |  |
| 0073289 | 3/1983 | European Pat. Off. | 350/635 |
| 0186366 | 7/1986 | European Pat. Off. |  |
| 7219926 | 5/1972 | Fed. Rep. of Germany . |  |
| 2436339 | 2/1976 | Fed. Rep. of Germany | 350/635 |
| 7801036 | 4/1978 | Fed. Rep. of Germany . |  |
| 3544333 | 6/1987 | Fed. Rep. of Germany | 350/635 |
| 57-7734 | 1/1982 | Japan | 350/635 |
| 0814796 | 3/1981 | U.S.S.R. | 350/635 |
| 1543818 | 8/1975 | United Kingdom . |  |
| 2030532 | 4/1980 | United Kingdom | 350/635 |

Primary Examiner—Bruce Y. Arnold
Assistant Examiner—Martin Lerner
Attorney, Agent, or Firm—Fleit, Jacobson, Cohn, Price, Holman & Stern

[57] ABSTRACT

Disclosed is an outside rear view mirror for a vehicle which has a mirror housing mounted to a pedestal such that it may rock relative to the pedestal upon impact from the front or from the rear. Within the mirror housing, means are provided for holding a mirror glass which allow pivoting of the mirror glass about any one or both of two perpendicular pivot axes, one of which is normally upright and the other of which runs transversely to the car body to which the pedestal is fastened. An adjusting device for adjusting the position of the mirror glass includes a lever which is pivotably mounted within the pedestal, and one end of which is provided with a handle and the opposite end of which is coupled to a rod. The rod extends through a joint coupling the mirror housing rockably to the pedestal into the mirror housing and is pivotably mounted to a stud means projecting from the back of the mirror and offset from the point of intersection of said axes.

7 Claims, 6 Drawing Sheets

F I G. 3
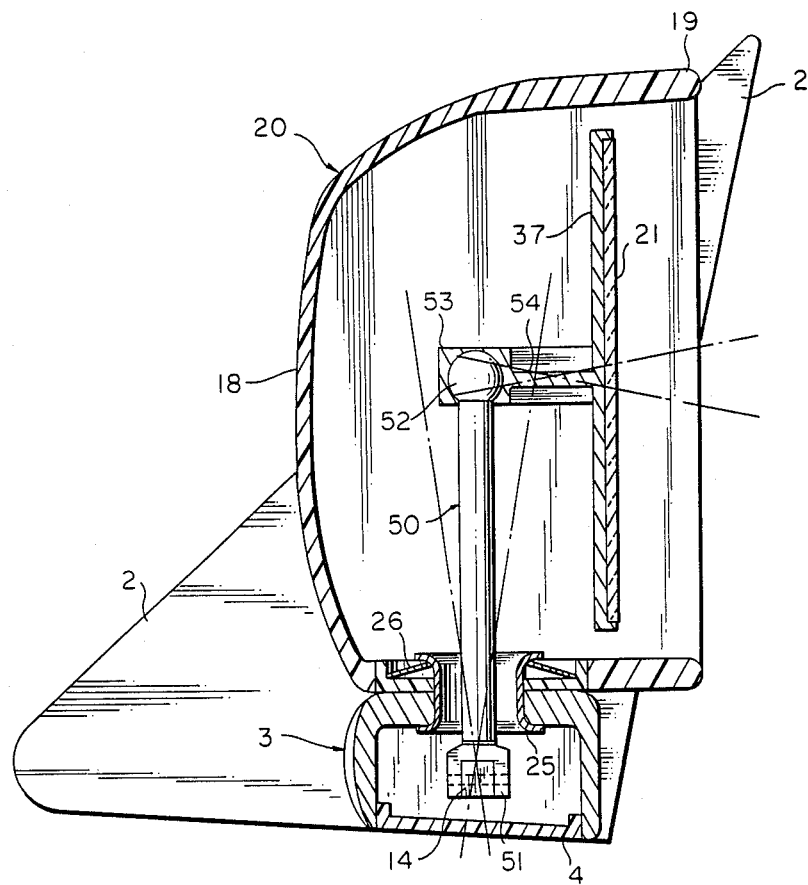

OUTSIDE REAR-VIEW MIRROR WITH A MECHANICALLY ADJUSTABLE MIRROR GLASS FOR A VEHICLE

DESCRIPTION

Outside rear-view mirror with a mechanically adjustable mirror glass for a vehicle.

The invention refers to an outside rear-view mirror for a vehicle, having a mirror glass and a mirror housing and a pedestal which is adapted to be fastened to the car body and to which the mirror housing is rockably mounted.

German Utility Model Specification No. 78 06 907 discloses an outside rear-view mirror for a car, the mirror glass of which may be adjusted by pivoting it about anyone or both of two perpendicular axes, one of which is normally upright and the other of which runs transversely to the car body to which the pedestal is fastened. In the mirror housing a tilting bar is provided with two opposite pins, each being supported within a bracket fastened to the base of the mirror housing, and is provided with two further pins extending from the bar transversely to the first pair of pins and supported within a member fastened to the mirror glass. Bowden cables are hung into the member and extend through the mirror housing and a pedestal of the outside rear-view mirror to which the mirror housing is rockably mounted. The ends of the Bowden cables adjacent the pedestal are connected to a transmission device for transferring a manually caused displacement of a handle into push and/or pull of the Bowden cables. Thus, the position of the mirror glass may be adjusted as desired by a manipulation of the handle which is transferred into a pivoting movement of the mirror glass about said axes.

The known adjustment device for the mirror glass of an outside rear-view mirror for a car is of complex and stiff structure because the Bowden cables are substantially bent along their extension through the pedestal and the hinge connecting the mirror housing to the pedestal.

It is therefore an object of the invention to provide an improved outside rear-view mirror, the mirror glass of which may be adjusted more easily by corresponding manipulation of the handle in the interior of the car. It is a further object of the invention to devise a simple adjustment means of high reliability and extended life time. Moreover, the structure of the adjustment means should preferably not be affected by any rocking movement of the mirror housing.

According to the invention, the outside rear-view mirror for a vehicle has a mirror housing which is mounted to a pedestal such that it may rock relative to the pedestal upon impact from the front or from the rear. Within the mirror housing, means are provided for holding a mirror glass which allow pivoting of the mirror glass about anyone or both of two perpendicular pivot axes, one of which is normally upright and the other of which runs transversely to the car body to which the pedestal is fastened. An adjusting device for adjusting the position of the mirror glass includes a lever which is pivotably mounted within the pedestal, and one end of which is provided with a handle and the opposite end of which is coupled to a rod. The rod extends through a joint coupling the mirror housing rockably to the pedestal into the mirror housing and is pivotably mounted to a stud projecting from the back of the mirror and offset from the point of intersection of said axes.

The invention overcomes the drawbacks and inconveniences of known adjustment devices inherent in utilizing Bowden cables and ensures sensitive adjustment of the position of the mirror glass by manipulating the handle in the interior of the car. The direction of manipulation of the handle causes a corresponding directed rotation of the mirror glass. Furthermore, only a few parts are needed for assembling the adjusting device, which requires only low costs for producing and assembling the device.

Normally, a backing member is fixed to the mirror glass and is clamped on a ball fastened to the mirror housing, about which it may pivot. The backing plate may then be coupled to the rod quite easily when, according to an embodiment of the invention, the stud constitutes a shank which is held movably on the rearward side of the backing member, for instance by being snapped in tabs, and which is mounted pivotably to the end of the rod in the mirror housing.

In a further improvement of the invention an even more exact adaptation of the pivoting movements of the mirror to the corresponding adjustment movements of the handle is achieved when the rod has a ball-like thickening which is kept rotatably and slidably in a guiding member mounted to the mirror housing so as to be slidable in the direction of the rocking axis of the mirror housing.

For simplifying the transfer of the manually caused movements of the lever to corresponding movements of the rod, the end of the rod positioned within the pedestal is formed to a fork which encompasses the flattened adjacent end of the lever and is coupled with the latter by means of a pin.

The adjustment mechanism of the outside rear-view mirror according to the invention needs no maintenance, is constituted by only few spare parts, is not influenced in its function by a rocking of the mirror housing towards the car body and is practically clearance-free.

Figure 2:
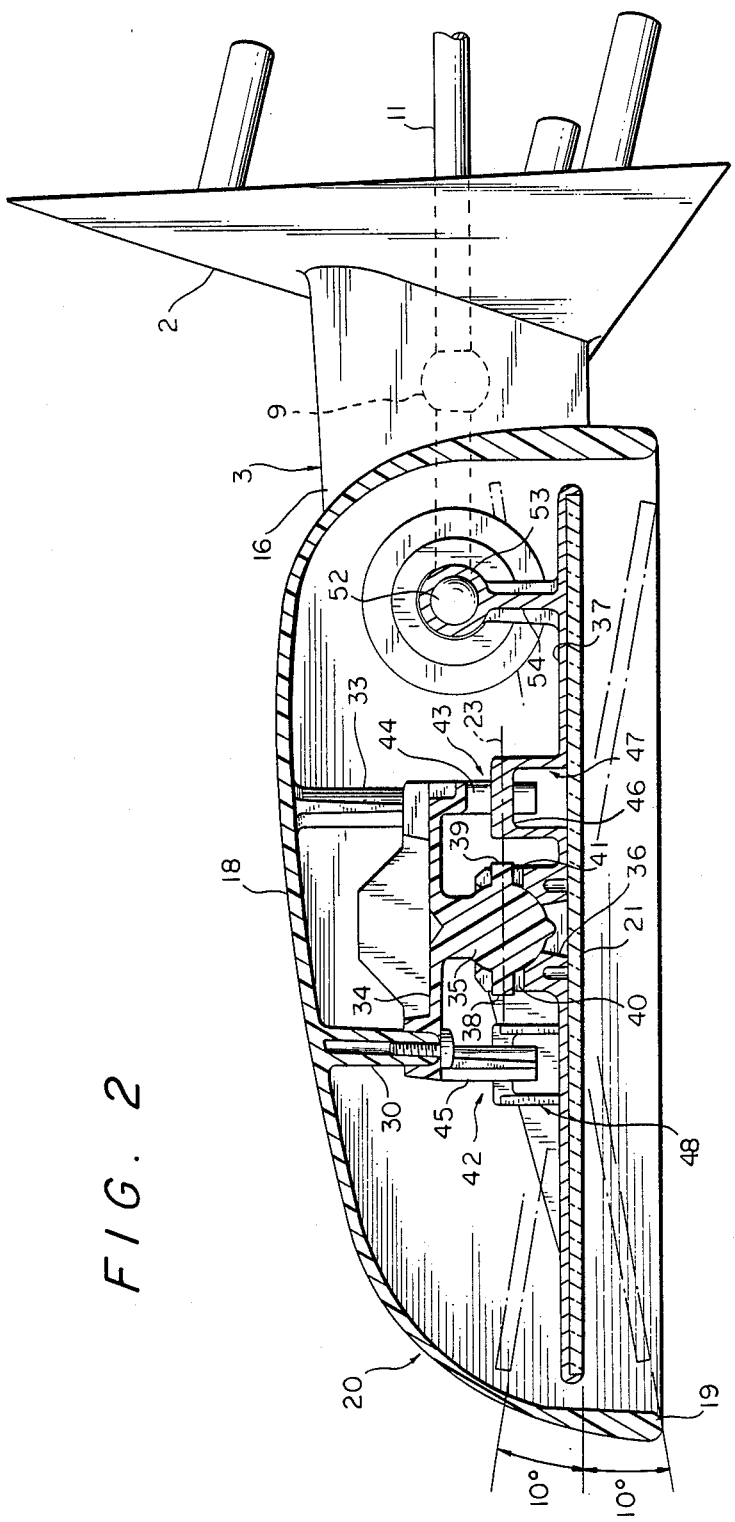
Figure 4:
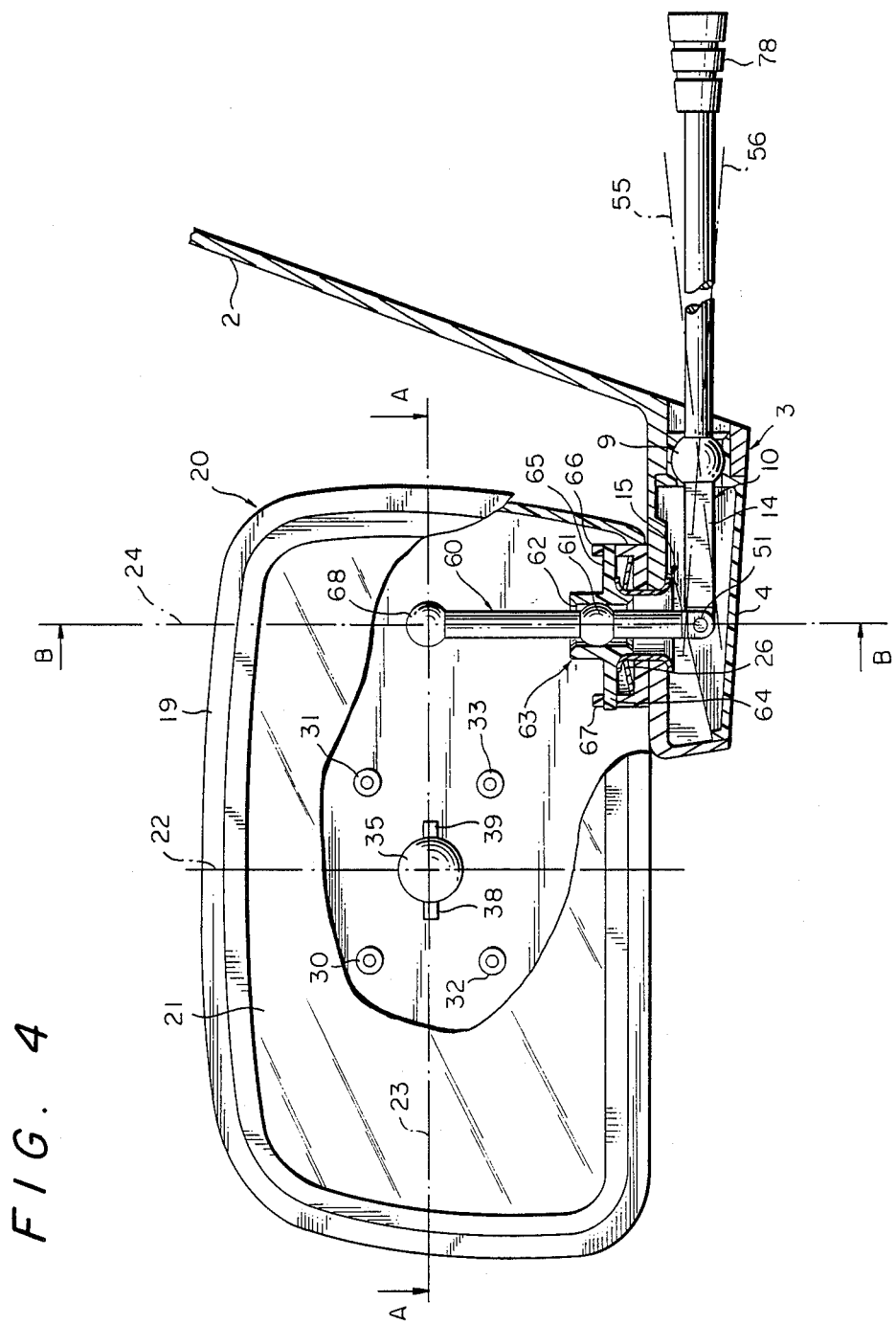
Figure 5:
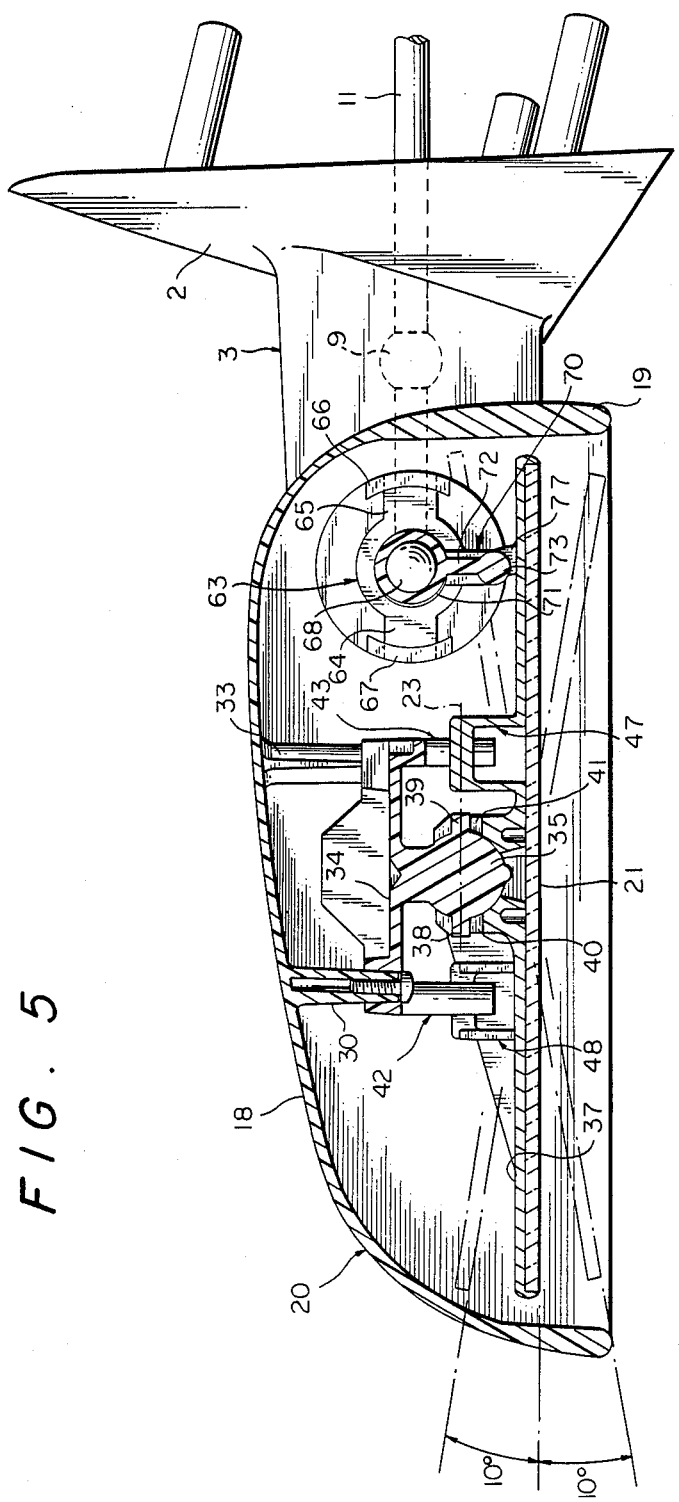
Figure 6:
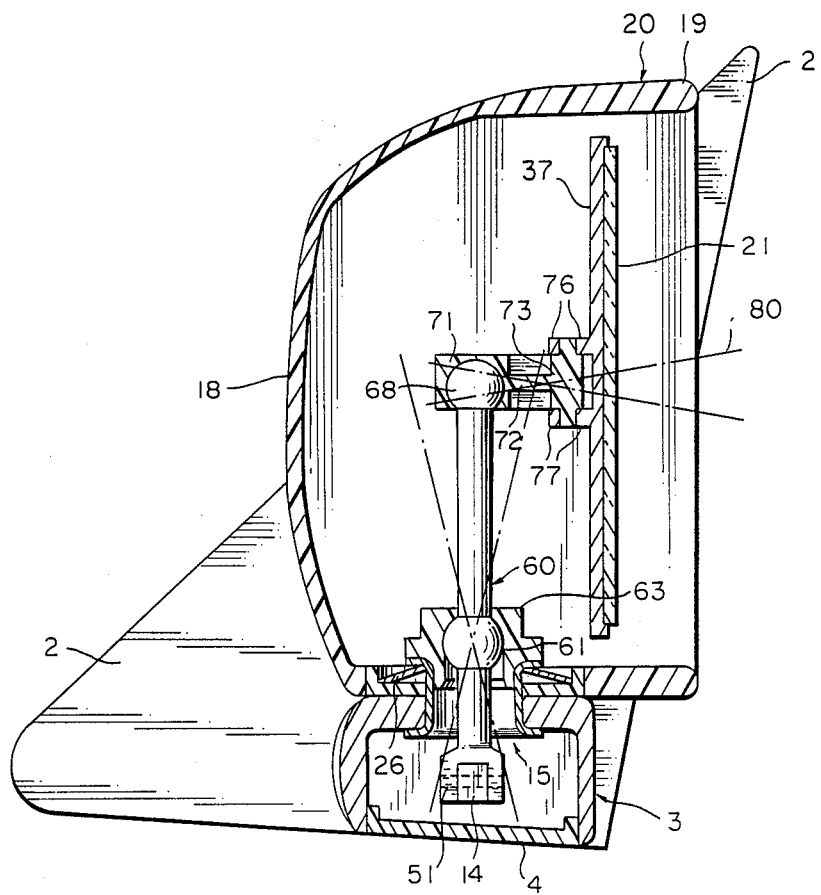

Preferred embodiments of the invention are explained in detail below with reference to the accompanying drawings, in which FIG. 1 is a plan view of the outside rear-view mirror, partially in section, in forward driving direction of a car, to which the rear-view mirror may be mounted;

FIG. 2 is a schematic sectional view along line A—A of FIG. 1;

FIG. 3: is a schematic sectional view along line B—B of FIG. 1;

FIG. 4: a plan view of another embodiment of an outside rear-view mirror similar to FIG. 1;

FIG. 5: a schematic sectional view along line A—A of FIG. 4;

FIG. 6: a schematic sectional view along line B—B of FIG. 4;

The invention is explained for a left-side outside rear-view mirror for a passenger car, however, it is not limited to this type of application. A mounting device 1 for the mirror housing 20 includes a mounting plate 2 adapted to the car body, from the lower rim of which a hollow pedestal 3 protrudes laterally. The hollow space 5 of pedestal 3 closed from below by a plastic cap 4 is provided with an opening 6, which is in alignment with an opening leading into the interior of the vehicle when the mirror is mounted to the vehicle. Opening 6 expands into the hollow space 5 through a shoulder 7. A plastic bearing 8 is mounted, e.g. glued into the opening 6 which abuts shoulder 7. The plastic bearing 8 is used for a ball 9 of a lever 10. In the simplified illustration facilitating the understanding of the invention, an arm 11 of lever 10 extends from ball 9 and projects out of the pedestal 3 through opening 6 and is elongated to a laterally offset handle 12 which projects into the interior of the vehicle. Optionally, arm 11 may also extend lengthwise into the interior of the vehicle, to the free end of which a bent grip 13 is fixed.

Lever 10 is provided with a lever arm 14 which extends into the hollow space 5 opposite to arm 11 and is in alignment with arm 11. The free end of lever arm 14 is flattened and located beneath an open passage of a joint 15.

The mirror housing 20 which is bulged in forward driving direction of the car and open to the opposite direction surrounds by its substantially rectangular rim 19 with rounded edges a mirror 21 which is pivotably mounted to the inner side of base 18 of the mirror housing 20 in a manner still to be described. The mirror housing 20 is coupled at its lower section adjacent to device 1 to pedestal 3 via joint 15, so that it may rock about a rocking axis 24 upon impact from the normal position shown in FIGS. 1 to 3 to the car body in a manner known per se. For this purpose a rivet 25 having a lower beaded rim and an upper beaded rim penetrates an opening 17 in the flat upper side 16 of pedestal 3 as well as an opening in the mirror housing 20, and its lower beaded rim engages the inner edge of pedestal opening 17 from below. The upper beaded rim of rivet 25 projects into the interior of mirror housing 20 and is abutted from below by a leaf spring 26 which is supported by the inner side of mirror housing 20. The axis of rivet 25 defines the rocking axis 24 of the mirror housing 20. Not illustrated are catches defining the shown, normal position of the mirror housing 20, which have to be surmounted in order to cause rocking of mirror housing 20 following an impact.

Four stands 30, 31, 32, 33 extend from the middle of the inner side of the mirror housing base 18. They are formed from the mirror housing consisting of hard plastic material and support commonly a mounting plate 34 screwed onto them. The arrangement and number of stands is not critical, they are merely to permit a firm position for mounting plate 34, which is not influenced by the forces occurring when mirror 21 is adjusted. A ball 35 protrudes from mounting plate 34 towards mirror 21 and is positioned substantially centrally with respect to the opening of the mirror housing surrounded by rim 19. A light-reflecting mirror glass 21 is fastened to a mirror glass backing plate 37, from which is formed centrally a stud 36 opposite to the mirror glass 21, which has clamping fingers for radially resiliently grasping ball 35. The clamping force of stud 36 onto ball 35 prevents on the one hand that the mirror glass backing plate 37 including the mirror glass 21 is loosened unintentionally from ball 35, and, on the other hand, permits a pivoting movement of mirror 21 about the axes 22 and 23. The axes 22 and 23 intersect in the center point of ball 35, are perpendicular to each other and are parallel to the plane of mirror 21 when it assumes a middle position within its range of adjustment. Said middle position of of mirror 21 is shown with extended lines in FIGS. 2 and 3.

For understanding the function of the adjustment mechanism explained in the following it is important to note that backing plate 37 is mounted to the mounting plate 34 in such a way that mirror 21 cannot pivot about an axis perpendicular to anyone of axes 22 and 23. This is, for instance, achieved by two opposite journals 38, 39 formed from ball 35 and lying in the horizontal pivoting axis 23. Eah of the journals is captured in a substantially horizontally extending longitudinal slot 40, 41, which is opened backwardly and cut into stud 36. As may be seen from FIG. 2, mirror 21 may pivot about both axis 23 (i.e. mirror 21 turns up and down) and axis 22 (i.e. mirror 21 turns inwardly or outwardly) while journals 38, 39 slide within the longitudinal slots 40, 41.

Optionally, or, as shown, additionally to journals 38, 39 the backing plate 37 can be guided by two fork means 42, 43 spaced in direction of axis 23 and provided on either side of ball 35. It would suffice, however, to provide only one fork means on one side of ball 35. As both fork means 42, 43 are of identical construction, only fork means 43 is described hereinafter in detail.

Fork means 43 comprises a fork formed from the mounting plate 34 and projecting therefrom towards the rearward side of backing plate 37. One of the fork arms extends above axis 23 and the second fork arm extends below axis 23. In FIG. 2 only the second fork arm 44 may be seen. The two opposing fork arms catch a transverse portion 46 of a bow 47 formed from the rearward side of backing plate 37 such that the transverse portion 46 extends along axis 23. Thus, transverse portion 46 may slide transversely to axis 23 between the opposing fork arms and may rotate therebetween, but, on the other hand, cannot escape from between the fork arms upwardly or downwardly. The second fork means 42 is provided opposite to the first fork means 43 with respect to ball 35 and is shown schematically in FIG. 2 such that the fork arm 45 extending above axis 23 is illustrated. In summary, it may be seen that each of the fork means 42, 43 prevents mirror 21 from rotating about an axis perpendicular to axes 22 and 23 around ball 35.

For adjusting mirror 21 the adjustment device according to the invention includes a rod 50 extending axially through rivet 25 in the rocking axis 24. The lower end of rod 50 housed within pedestal 3 is coupled to the flattened end of arm 14 in a fork-like manner and is connected to the same by means of a pin 51 extending transversely through said lower end of rod 50 and said flattened end of arm 14. The upper end of rod 50 terminates in a ball 52, which is caught rotatably within an eye 53 of an arm 54. Arm 54 is mounted to the rearward side of backing plate 37 between fork means 43 and that side of the backing plate 37 next to the pedestal. It is recommended to provide arm 54 in the height of the horizontal pivoting axis 23. Eye 53 has a plastic bearing surrounding ball 52 permitting a rotation of ball 52 within the bearing. In the illustrated embodiment of the invention axis 23 extends between ball 52 and backing plate 37.

The adjustment device for mirror 21 according to the invention thus mainly comprises lever 10, rod 50 and arm 54 and permits an adjustment of mirror 21 about axis 23, which is mainly horizontal when pedestal 1 is mounted to the vehicle, and/or about axis 22, which is substantially vertical when the mirror is mounted. When for this purpose in the plane of FIG. 1 grip 13 is moved upwards from the center position shown in FIG. 1 until the center line of lever 10 is approximately in the position indicated at 55, rod 50 is moved downwards by lever 10 along the rocking axis 24. Ball 52 contained in the eye 53 pulls the eye downwards. Since mirror 21 is captured in the fork means 42, 43 and the journals 38, 39 are captured in slots 40, 41, mirror 21 tilts upwards around axis 23 due to the fact that axis 23 passes between backing plate 37 and ball 52 and intersects arm 54. However, when in the plane of FIG. 1 grip 13 is moved downwards until approximately to line 56, this movement is transmitted by lever 10 into an upward movement of rod 50 along rocking axis 24 with the effect that the mirror tilts downwards about axis 23.

If, when viewing FIG. 1, grip 13 is turned backwards around the center line 57 of lever 10 located in a middle position, this turning is transmitted in a pivoting of rod 50 out of rocking axis 24 in a backward direction due to the forklike mounting of rod 50 at the flattened end of lever arm 14. This has the effect that mirror 21 pivots around the vertical axis 22 such that the mirror portion adjacent to pedestal 3 turns towards the interior of mirror housing 20. During this pivoting journals 38, 39 slide within the longitudinal slots 40, 41 and the transverse portions of bows 47, 48 slide between the opposite arms of fork means 42, 43. If, on the other hand, grip 13 is turned around longitudinal axis 57 out of the plane of FIG. 1 in a forward direction, rod 50 pivots out of the rocking axis 24 with its ball 52 in a forward direction, so that said mirror portion pivots around axis 22 in an outward direction.

In order to exclude a movement of arm 11 of lever 10 perpendicular to the plane of FIG. 1, it is recommended to form opening 6 to a slot or to narrow it by a non-illustrated cap provided with a slot. This slot makes it then possible to merely rotate grip 13 around the center line of lever 10 and to move it between the lines 55, 56. The lines 55, 56 may be defined by a limitation of the slot mentioned before and include an angle permitting a pivoting of mirror 21 for, for instance, 10° to both sides around axis 23.

The embodiment of the invention according to FIGS. 4 to 6 differs from the embodiment described above in that rod 50 may be replaced by a rod 60 having shortly above rivet 25 a ball-like thickening 61, which is kept rotatably in the axial boring 62 of a guiding member 63 and slidably along the rocking axis 24. For easing the assembly, the guiding member 63 is provided with two opposing radially projecting tongues 64, 65, which are anchored at rails 66, 67 protruding from mirror housing 20. For this purpose rails 66, 67 may be provided with a slot into which one of the tongues 64, 65 may be inserted and captured. At any rate, the guiding member 63 is kept in non-rotatable and non-slidable condition at rails 66, 67.

Furthermore, unlike in the embodiment of the invention described above, arm 54 is replaced by a separate shank 70 facilitating the assembly of mirror 21 with backing plate 37. Shank 70 captures rotatably a ball 68 at the upper end of rod 60 within an eye 71. Via a projecting bridge 72 eye 71 is connected with a cylindrical journal 73 extending parallel to the axis of eye 71. Two vertically spaced, parallel tabs 76, 77 protrude from the rearward side of backing plate 37. In their vertically aligned openings the upper and lower end of journal 73 is kept rotatably. Tabs 76, 77 may be elastic so that journal 73 snaps into the openings.

In all other features the embodiment of the outside rear-view mirror according to FIGS. 4 to 6 resembles the one according to FIGS. 1 to 3 with the exception that that opening 6 permits a movement of arm 11 perpendicular to the plane of FIG. 4. Contrary to the first embodiment of the invention lever 10 cannot be rotated around its center axis, because thickening 61, the center of which is intersected by rocking axis 24, is kept in the axial boring 62. When handle 78 mounted at the free end of arm 11 is moved upwards in the plane of FIG. 4 to the effect that the center line of lever 10 shifts to line 55, rod 60 is pulled downwards whereby thickening 61 slides within axial boring 62. Due to the fork-like guidance of mirror 21 at mounting plate 34 mirror 21 pivots upwardly around axis 23. Bridge 72 then extends approximately along line 80 in FIG. 6. When handle 78 is moved downwards in the plane of FIG. 4 until line 56, rod 60 is moved upwards so that mirror 21 pivots downwards around axis 23.

However, when handle 78 is moved upwards from the plane of FIG. 4 around the center point of ball 9, rod 60 turns around the center point of thickening 61 in such a way that ball 68 is pivoted in a forward direction from the plane of FIG. 4 and the mirror portion adjacent to pedestal 3 swivels outwardly around vertical axis 22. When, on the other hand, handle 78 is moved backwards from the plane of FIG. 4, rod 60 pivots around the center point of thickening 61 in such a way that ball 68 is shifted below the plane of FIG. 4 and, as a consequence, said mirror portion pivots towards the interior of housing 20 about vertical axis 22.

What is claimed is:

1. An outside rear-view mirror for a vehicle, said rear-view mirror comprising:
   a pedestal adapted to be mounted to the vehicle,
   a mirror housing,
   a joint for rockably mounting said mirror housing to said pedestal,
   a mirror glass,
   a mirror backing for mounting said mirror glass in said mirror housing,
   a mounting plate secured to said mirror housing,
   pivot means for holding said mirror backing for pivoting of said mirror glass about at least one of two perpendicular pivoting axes, one said axes being normally upright and the other of said axes running transversely to the vehicle to which the pedestal may be fastened, said pivot means including a ball defined by said mounting plate, said ball being clamped by a portion of said mirror backing, said ball including two opposite extending journals extending into associated slots defined by said mirror backing for allowing some rotation but limiting to less than a complete rotation the movement of said mirror glass along at least one of said pivoting axes, said pivot means also including at least one first fork means for guiding said mirror backing relative to said mirror housing about said ball, said at least one first fork means protruding from said mounting plate and having a transverse member provided on said backing member,
   an adjusting device for adjusting the portion of said mirror glass, said adjusting device including a lever pivotally mounted within said pedestal,
   one end of said lever extending out of said pedestal towards the vehicle and the opposite end of said lever being coupled to a rod in the form a second fork means for allowing pivotal movement between said lever and said rod, said rod extending through said joint into said mirror housing and being pivotably mounted to a stud means projecting from a back of said mirror glass and offset from a point of intersection of said axes, said rod having a ball-like thickening kept slidably and rotatably in a guiding member mounted to said mirror housing and extending along a rocking axis of said mirror housing.

2. Outside rear-view mirror according to claim 1, wherein said axis running transversely to the vehicle extends between a mount of said rod to said stud means and said mirror backing of said mirror glass.

3. Outside rear-view mirror according to claim 1, wherein said stud means include an arm mounted to a rear of said mirror backing and is provided with an eye within which a free end of said rod opposite to said lever is rotatably kept.

4. Outside rear-view mirror according to claim 3, wherein said arm is formed from said rear of said backing member to which said mirror glass is fastened.

5. Outside rear-view mirror according to claim 1, wherein said stud means include a shank which is fastened pivotally to a rear of said mirror backing and which is rotatably mounted to a free end of said rod opposite to said lever.

6. Outside rear-view mirror according to claim 5, wherein said shank is pivotally mounted to said backing member to which said mirror glass is mounted.

7. Outside rear-view mirror according to claim 1, wherein said lever is guided within a slot provided in said pedestal.

* * * * *